Feb. 10, 1931.                H. E. ALTGELT                 1,791,782
                      TRANSMISSION HOUSING CONSTRUCTION
                       Original Filed March 12, 1928    3 Sheets-Sheet 1

Inventor.
Herman E. H. Altgelt.
By John P. Smith
Atty.

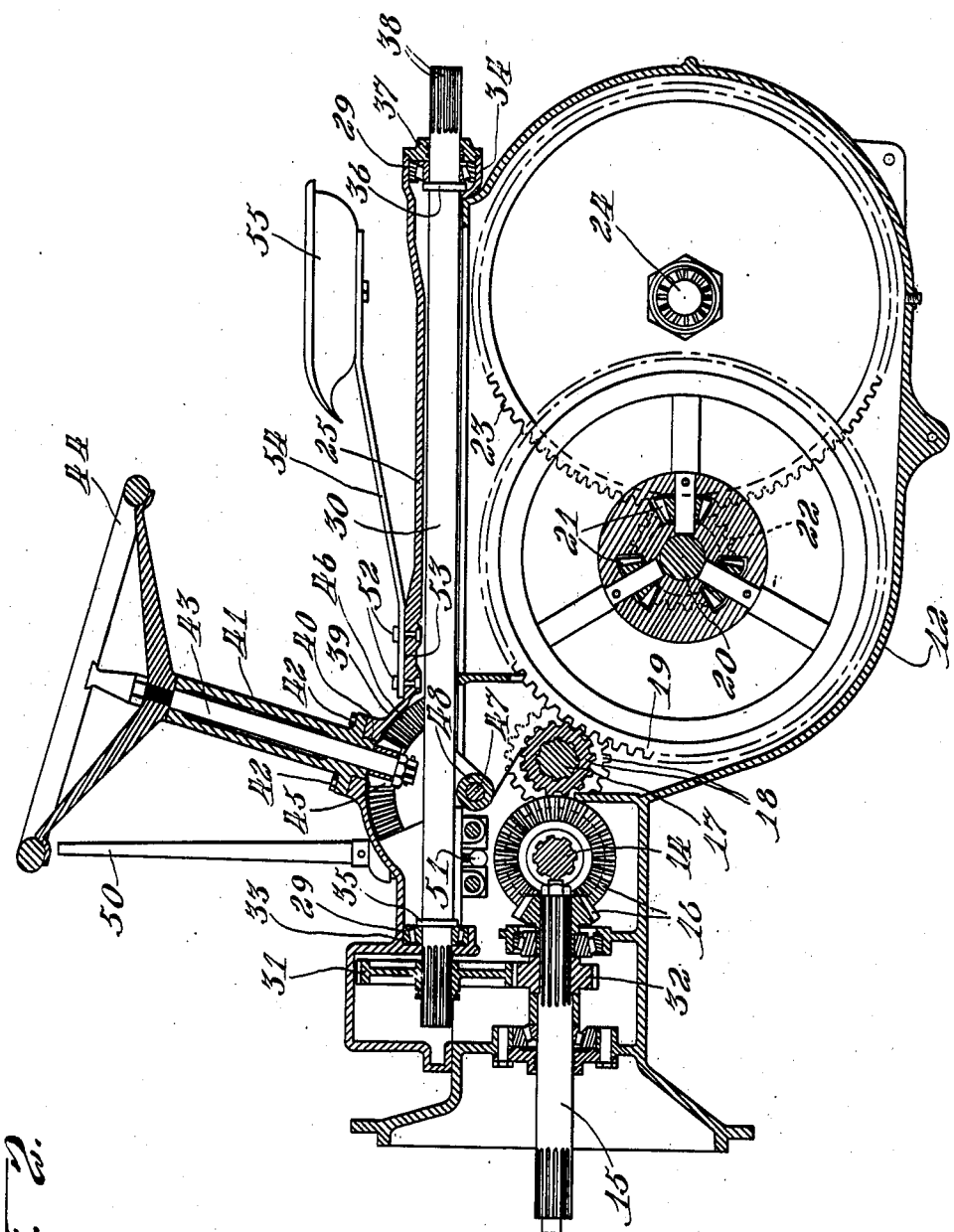

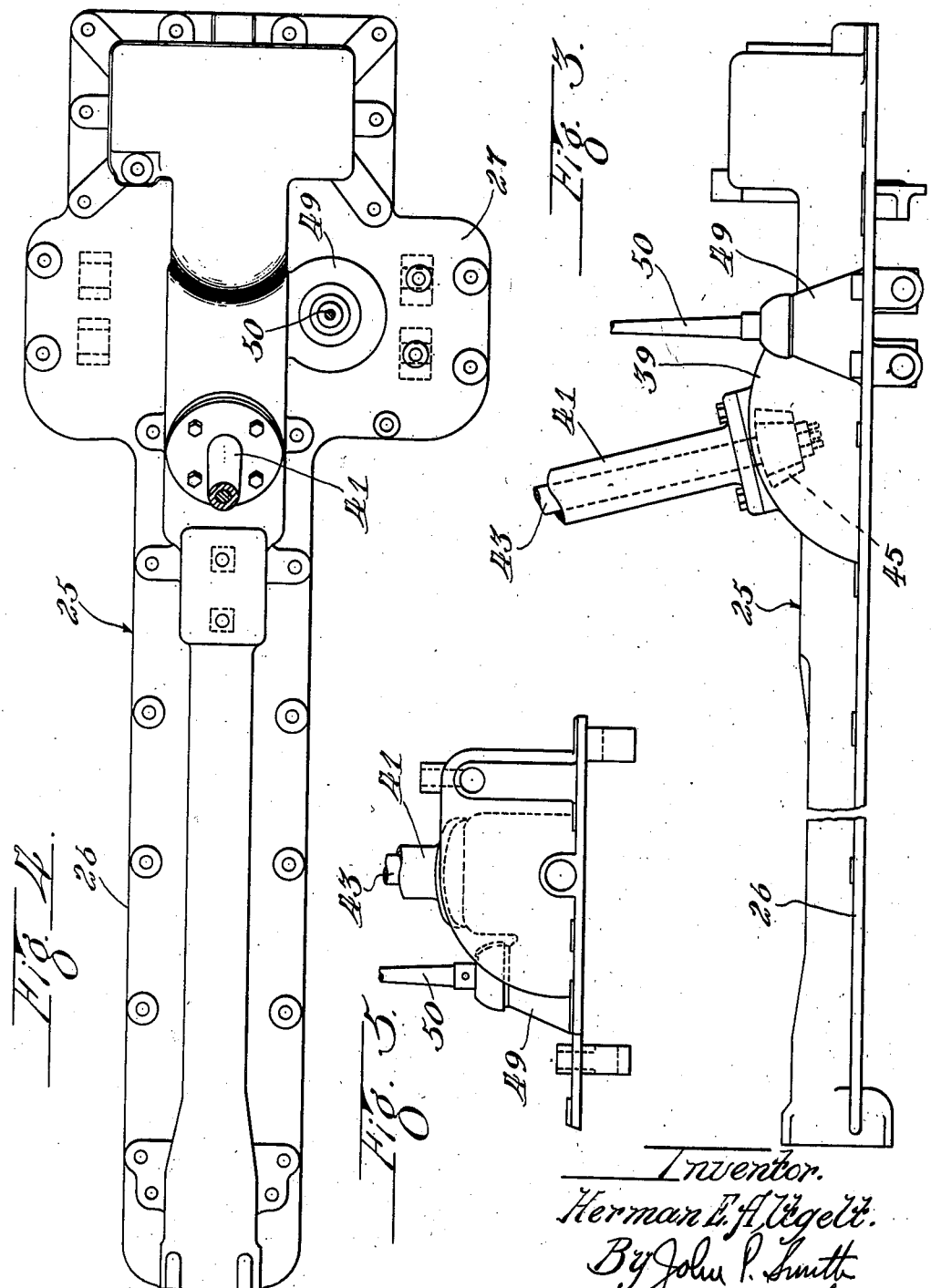

Patented Feb. 10, 1931

1,791,782

UNITED STATES PATENT OFFICE

HERMAN E. ALTGELT, OF SOUTH BEND, INDIANA, ASSIGNOR TO OLIVER FARM EQUIPMENT COMPANY, A CORPORATION OF DELAWARE

TRANSMISSION-HOUSING CONSTRUCTION

Original application filed March 12, 1928, Serial No. 260,871. Divided and this application filed June 10, 1929. Serial No. 369,570.

The present invention relates to a transmission assembly and housing construction for a motor vehicle and has particular reference to the efficient operation, easy assembly and increased production and manufacture of tractors for use in connection with and adaptation for a variety of agricultural attachments and implements.

One of the objects of the present invention is to provide a simple and efficient arrangement of a transmission assembly and housing construction in which the number of operating parts thereof, are reduced to a minimum.

A further object of the invention is to provide a novel construction of a transmission housing cover, which has assembled therein as a unit the steering mechanism and post, the change speed lever and shifter forks, and the power take-off shaft for driving other implements or attachments.

These and other objects are accomplished by providing a construction and an arrangement of the various parts in the manner hereinafter described and particularly pointed out in the appended claims.

Referring to the drawings, Fig. 1 is a side elevational view showing the construction of my improved transmission housing and transmission cover unit secured thereto.

Fig. 2 is a longitudinal cross-sectional view view of the construction shown in Fig. 1.

Fig. 3 is a side elevational view of the cover housing unit.

Fig. 4 is a top plan view of the cover housing unit shown in Fig. 3, and

Fig. 5 is an end elevational view of the same.

Figure 1:
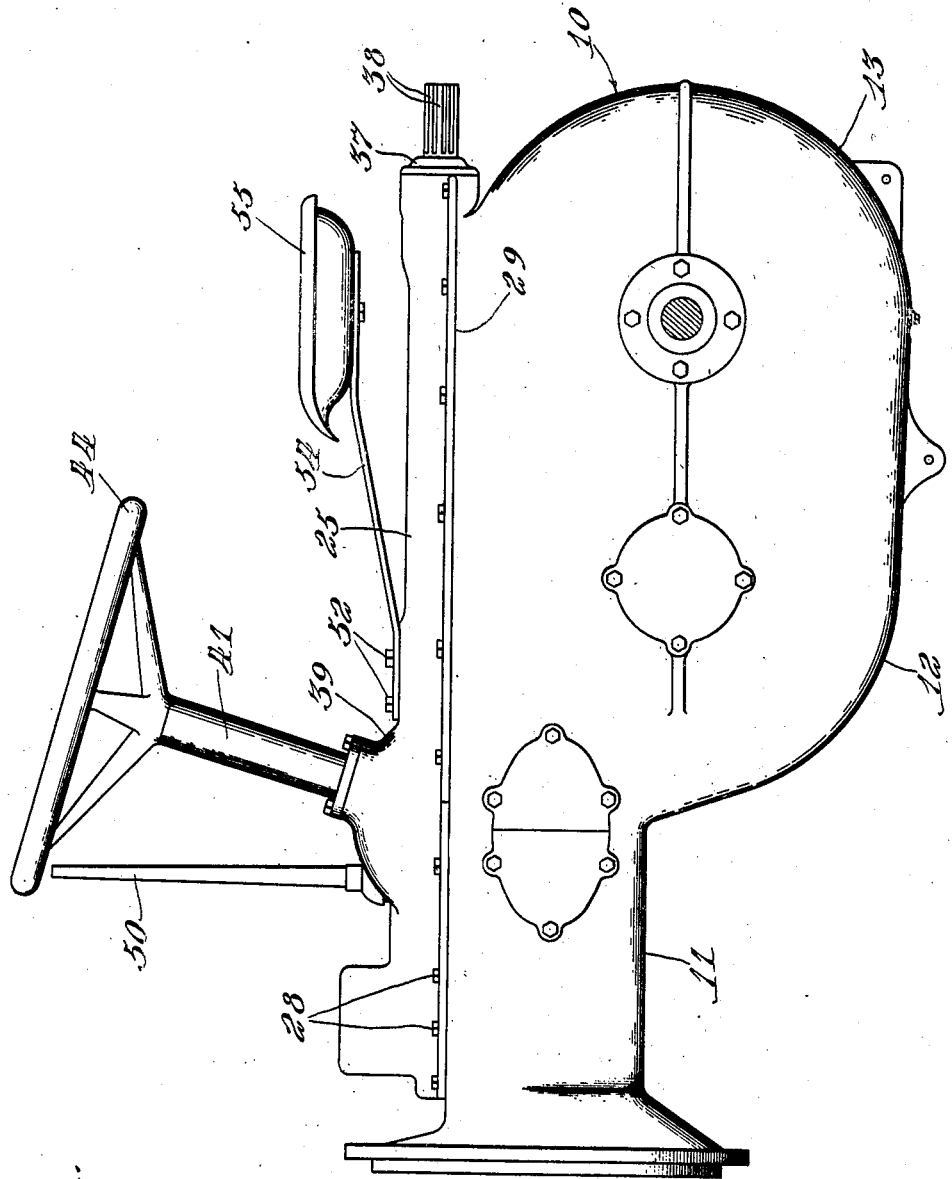

The present invention is a divisional application of my co-pending application, Ser. No. 260,871, filed March 12, 1928 on a Transmission mechanism and housing construction.

In illustrating one form of my invention, I have shown the same in connection with a main frame casting or transmission housing generally indicated by the reference character 10. This main frame casting or transmission housing consists essentially of a relatively shallow change speed gearing portion 11, a relatively deep and narrow differential portion 12 having an extended and relatively deep rear axle gear portion 13 formed integrally and substantially continuous with the last named portion. Mounted in the change speed transmission housing is a main transmission gear shaft 14 which is operatively driven by the longitudinally extending main drive shaft 15 through the medium of bevelled gears 16. Mounted parallel to the main transmission shaft 14 is a supplemental transmission change speed gear shaft 17 which has mounted thereon, suitable transmission gears 18 which are adapted to be operatively meshed with gears carried on the main shaft 14 in the manner described in my co-pending application. Operatively driven by one of the transmission gears 18 is a differential gear 19 which is secured to a transverse shaft 20 within the differential housing 12. This differential mechanism comprises the usual bevelled gears 21 which in turn, mesh with oppositely disposed bevelled gears (not shown) in the manner described in my previously mentioned co-pending application. These bevelled gears (not shown) are formed integrally with oppositely disposed spur gears 22 which, in turn, mesh with the main drive gears 23 secured to the rear axle 24 of the tractor.

The mechanism thus far described, constitutes the transmission, differential and driving mechanism and the construction of the housing therefor, and forms the essential part of my above mentioned copending application and a more detailed description of the same is unnecessary for a complete description of the essential features of the present invention. If a better understanding of this mechanism is required, reference to the co-pending application may be had.

The essential feature of the present invention consists in the provision of a novel construction of a transmission housing cover, which has assembled therein as a unit, the steering mechanism and post and its associated parts, the change speed lever and shifting fork mechanism and its associated parts, and the power take-off shaft mechanism and its associated parts for driving other implements which may be attached or operatively connected with the tractor. The primary object of combining these separate parts in one unit is for the purpose of permitting the unit to be assembled separately and then mounted on the housing of a transmission casing so as to expedite the assembly and thereby, increase the production and manufacture of the tractor.

This unit comprises a housing cover member or casing, generally indicated by the reference character 25 which consists of a relatively long, narrow rear portion 26 and a relatively wide front portion 27 which is adapted to be mounted and secured by means of bolts 28 to the upper portion or flange 29 of the transmission and differential housing 11, 12 and 13. The opening which is adapted to receive the transmission cover member 25 is complementary to the configuration of the cover so as to completely cover the opening in the housing when the unit is secured in the position to the transmission housing 10, in the manner illustrated in Figs. 1 and 2. Mounted longitudinally of the transmission cover member 25 in suitable front and rear anti-friction bearings 29 is a power take-off shaft 30 which has secured to its front end a spur gear 31 which meshes with and is operatively driven by a pinion 32 which in turn, is secured adjacent the rear end of the main drive shaft 15. The forward end of the housing cover member 25 is provided with a circular recess 33 in which the forward anti-friction bearing 29 is mounted and the rearward end of the housing or cover member 25 is provided with a circular casing as shown at 34 in which the rear anti-friction bearing 29 is mounted. The power take-off shaft 30 is provided with an annular flange 35 adjacent its forward end so as to engage the inner race of the anti-friction bearing 29. The shaft 30 is provided adjacent its rear end with a second annular flange 36 which engages the inner race of the rear anti-friction bearing 29. These anti-friction bearings are held in position by a packing collar or plate 37 which is secured to the rear end of the cover member 25 in any well known manner. The rear end of the power take-off shaft is provided with a plurality of grooves 38 so as to provide convenient means for connecting operating parts of implement attachments to be driven by the power take-off shaft. Formed adjacent the forward end of the housing cover 25 is a dome-shaped base 39 having a centrally disposed aperture 40 formed therein in which is mounted a steering post 41 and secured thereto by means of bolts 42. Mounted in the steering post is a steering shaft 43; secured to the upper end of which is the regular form of steering wheel 44. Secured to the lower end of the steering shaft 43 is a bevelled pinion 45 which meshes with a steering sector 46. The sector 46 is secured to a shaft 47 which, in turn, is journaled in bearing barrels 48 formed in the transmission housing 10. The shaft 47 is provided with a depending crank (not shown), which in turn, is connected by a connecting rod to the front steering wheels of the tractor (not shown). It will, of course, be understood that the steering sector 46 is positioned and mounted in the transmission housing 10 in the manner illustrated in Fig. 2 prior to the time that the transmission cover is positioned in place for completely assembling the transmission mechanism and the mechanism contained in the transmission cover. Formed integrally with the transmission cover and preferably on one side of the dome-shaped portion 39 is a conically shaped portion 49 in which is mounted the conventional form of gear shaft lever 50, which in turn, is provided with the usual shifter fork 51 for shifting the different gears for changing the speed of the tractor. Secured by means of bolts 52 on a flat portion 53 to the cover member 25 adjacent to and at the rear of the steering post 41 is a seat supporting spring 54, on the free and rearward end of which is mounted an operator's seat 55.

When all the parts which constitute the steering mechanism, the gear shifting mechanism and the power take-off mechanism are properly assembled in a transmission housing cover 25, the same is mounted as a unit on the transmission housing 10 so as to cover the opening therein and then secured by means of bolts 28 as clearly shown in Figs. 1 and 2 of the drawings. By this arrangement of assembling these parts in separate units in which the units are later brought together to form the complete assembly of the rear portion of the tractor, I have provided a simple and efficient arrangement of a transmission assembly and housing construction in which the number of separating parts thereof, are reduced to a minimum so as to increase the rapid assembly and expedite the production and the manufacture of tractors, and at the same time, reduce the amount of labor that is ordinarily required in assembling these parts separately.

While in the above specification, I have described one embodiment which my invention may assume in practice, it will of course, be understood that the same is capable of modification and that modification may be made without departing from the spirit and scope of my invention as expressed in the following claims.

What I claim as my invention and desire to secure by Letters Patent is:

1. The combination with a transmission housing, of a power transmission mechanism mounted in said housing; a cover for said housing, a power take-off mechanism including a shaft journaled in said cover and being geared to said transmission mechanism, a steering mechanism mounted in said cover, and a gear shift mechanism mounted in said cover, including a lever and shifting forks engageable with said transmission mechanism.

2. The combination of a power transmission housing having a relatively opened upper portion, a power transmission mechanism mounted in said housing, of a cover unit secured to the open portion of said housing having a longitudinally extending power take-off shaft journaled therein and geared to said transmission mechanism, a steering mechanism including a post and steering wheel mounted in said cover, and a gear shifting mechanism mounted in said cover, including a lever and shifting forks operatively connected with said transmission mechanism.

3. The combination of a transmission housing, having a transmission mechanism mounted therein, there being a relatively elongated opening in the upper portion of said housing, a housing cover for the opening in said housing, having a relatively long extending rear portion and a relatively wide front portion, bearings mounted in the forward and rearward end of said cover, a power takeoff shaft journaled in said bearings, said shaft being geared to said power transmission mechanism for transmitting power to other implements, a steering mechanism mounted in said cover, and a gear shifting mechanism mounted in said cover, whereby said cover may be mounted on said housing as a unit.

4. The combination with a transmission housing, of a power transmission mechanism mounted in said housing, a cover unit for said transmission housing having movable mechanism mounted therein and adapted to be operatively connected with the transmission mechanism in said transmission housing and a power take-off shaft mounted longitudinally in said cover a gear on the shaft, whereby when said cover unit is positioned on said transmission housing, said shaft is operatively geared to the transmission mechanism in said transmission housing.

5. A transmission power take-off unit comprising a cover secured to a transmission housing of a tractor, a power take-off shaft mounted in said cover, a change speed gear lever mechanism mounted in said cover, and a steering mechanism mounted in said cover and adapted to be operatively connected to the steering mechanism mounted in said transmission housing whereby all of the movable elements on said cover unit may be operatively related to their complementary parts in said transmission housing when said cover is secured in position on said transmission housing.

6. The combination of a transmission housing having transmission mechanism mounted therein, said housing having a longitudinally extending opening on the top side thereof, a cover unit having change gear speed elements mounted thereon, a power take-off shaft mounted in said cover, a gear on said shaft, said cover being secured to said transmission housing so as to cover the opening therein whereby when said cover is secured in position on said housing the operative parts therein, operatively engage the complementary parts in said transmission housing.

7. The combination of a transmission housing, a transmission mechanism mounted therein, a steering sector mounted in said housing, a cover unit having a power take-off shaft journaled therein and adapted to be geared to said transmission mechanism and a steering mechanism including a steering shaft and pinion mounted in said cover, whereby when said cover is secured to said housing said pinion engages said steering sector.

8. A transmission power take-off unit comprising a cover secured to a transmission housing of a tractor, a power take-off shaft mounted in said cover, a change speed gear lever mechanism mounted in said cover, a steering mechanism mounted in said cover and an operator's seat secured to said cover whereby the operative parts carried by said cover are operatively connected to their respective complementary movable parts of said transmission mechanism of said housing when said cover is secured to said housing.

9. A power take-off unit for a transmission mechanism for a tractor comprising a cover, a power take-off shaft journaled in said cover having a gear secured at the forward end thereof and geared to the main drive shaft of said transmission mechanism and extending longitudinally of and above said transmission mechanism.

10. The combination of a transmission housing having a main drive shaft and transmission mechanism mounted therein, a cover unit secured to said housing having a steering part located substantially in the longitudinal center thereof, and a power take-off shaft geared to said main drive shaft and extending longitudinally in the center of said cover below said steering post whereby said cover and parts mounted therein may be assembled as a unit on said transmission housing.

In testimony whereof I have signed my name to this specification, on this 25th day of May, A. D. 1929.

HERMAN E. ALTGELT.